N. J. VERRET.
VEHICLE WHEEL.
APPLICATION FILED OCT. 6, 1919.
1,332,781.
Patented Mar. 2, 1920.
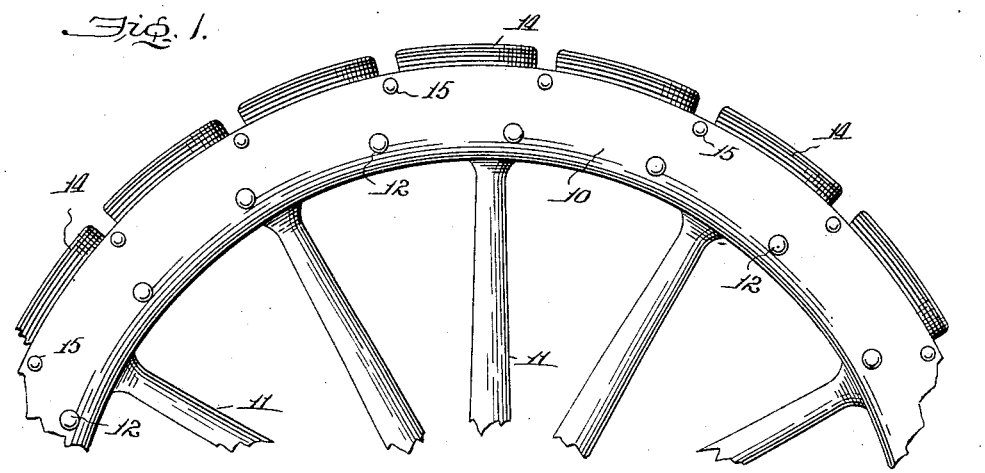
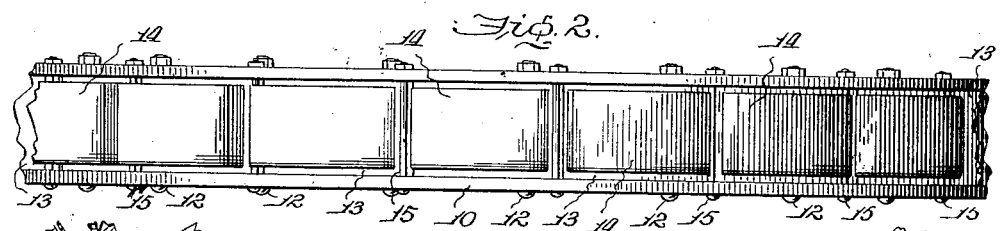
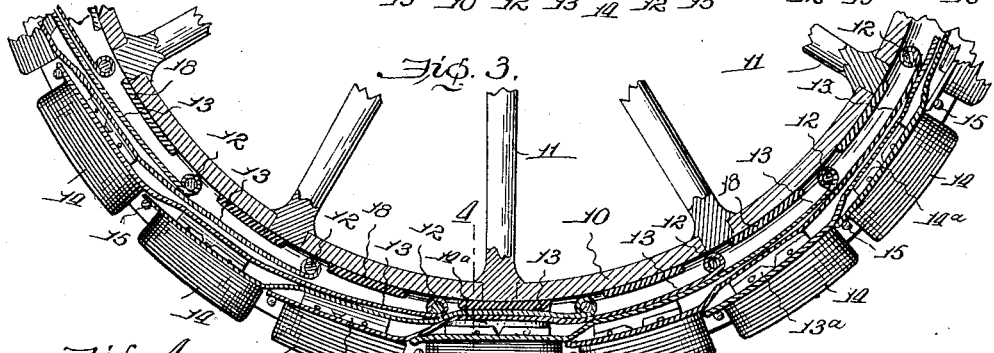
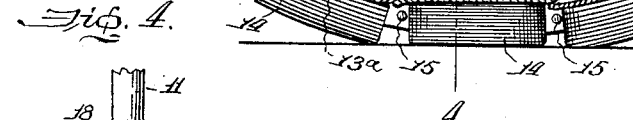
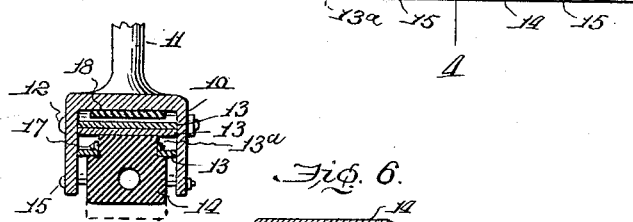
Nicholas J. Verret.
INVENTOR.
John B. Thomas & Co.
Attorneys.
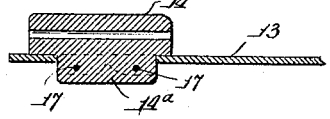

UNITED STATES PATENT OFFICE.

NICHOLAS J. VERRET, OF MEMPHIS, TENNESSEE, ASSIGNOR OF ONE-HALF TO HERBERT F. RAGLAND, OF MEMPHIS, TENNESSEE.

VEHICLE-WHEEL.

1,332,781.  Specification of Letters Patent.  Patented Mar. 2, 1920.

Application filed October 6, 1919. Serial No. 328,789.

*To all whom it may concern:*

Be it known that I, NICHOLAS J. VERRET, a citizen of the United States, residing at Memphis, in the county of Shelby and State of Tennessee, have invented certain Improvements in Vehicle-Wheels, of which the following is a full and complete specification.

My invention is an improvement in wheels for motor vehicles, and relates more especially to that particular class in which the resiliency of the tread portion or tire is provided by springs which serve to take up the shocks and jars while the vehicle is in motion.

The conventional pneumatic tire employed on the wheels of motor vehicles while effective in providing the desired resiliency is likely to become punctured at any time requiring repair or substitution of another tire with the consequent inconvenience and loss of time; and it is the primary object of my present invention, therefore, to provide a tire construction that will give the desired resiliency to the wheel and at the same time be strong, durable and serviceable, thus eliminating the objectionable feature of the ordinary pneumatic tire.

I accomplish this principal object in the present instance by forming the tread portion or tire of the wheel of a peripheral series of arcuate blocks carried at the outer ends of flat springs fulcrumed and so arranged within the rim or felly that the weight of the vehicle will be taken up by several of the springs coöperating as each block comes into play by contact with the ground, the said blocks being preferably composed of rubber so as to increase the resiliency and give better traction.

The construction and peculiar operation of the tread-blocks and springs constituting the resilient tire of the wheel are fully described in the following specification, and what I particularly claim as new and desire to protect by Letters-Patent is more specifically set forth in the appended claims.

In the accompanying drawings:

Figure 1 is a side view of a portion of a vehicle wheel provided with my improved tire construction.

Fig. 2 is a plan view.

Fig. 3 is a longitudinal sectional view through the tire at one side of the blocks, and showing the action of one of the blocks in contact with the ground.

Fig. 4 is a transverse sectional view on the line 4—4 of Fig. 3.

Fig. 5 is an inverted detail plan view of the outer end of one of the springs to show the manner of attaching the tread-block thereto.

Fig. 6 is a longitudinal sectional view through the spring and tread-block.

In carrying out my invention I make the rim or felly 10 of the wheel U-shape in cross-section to provide a peripheral channel in which the springs and tread-blocks constituting the tire may work, the walls of the channel being spaced apart according to the width of spring and size of tread-block it is desired to use. The spokes 11 may be of any type desired, being attached to the base portion of the rim or felly in the usual manner.

Projecting beyond the rim and working in the outer portion of the channel is a series of blocks 14 forming the tread of the tire construction, each block being attached, in the manner hereinafter described, to the outer end of a companion spring plate 13 also working within the channel and fulcrumed at its inner end on a transverse bolt 12 near the base of said channel, the spring plates extending from their fulcrums in the same direction all the way around the rim of the wheel. These spring plates are fulcrumed an equal distance apart, and each plate is of such length as to overlap two spring plates in advance of it around the wheel. As the tendency of the spring plate is outward it is confined within the channeled rim by means of a transverse pin or bolt 15 near the outer edge of the rim and located so that the terminal of said spring plate will contact therewith, and for this purpose the tread-block is attached a short distance from the outer end of the plate, as shown. Furthermore, it will be noted that the tread-blocks 14 are each located on a radial line extending between the fulcrums 12 so that said blocks may bear on the portions of the springs beneath between the bolts 12 and receive a cushioning action on said springs, thereby providing a reinforced spring action as pressure against the block increases; in other words a varying resiliency is provided to accommodate different conditions in the running of the wheel, for instance in ordinary running with a light load the blocks would operate under the influence of their own springs and as the load or pressure against the blocks increases the action of the first and second springs beneath would be taken up consecutively. This provides a spring tire construction that is not only effective in giving the desired resiliency but also provides a reinforcement for the springs which greatly increases the strength and durability of said tire construction. Excessive pressure on a tread-block may bend the coöperating springs beneath and between the fulcrum-bolts 12 so that they will bear against the bottom of the channel in the rim, but in some instances I interpose a rubber strip 18, to act as an additional cushion.

The rubber tread-blocks 14 may be attached to the outer ends of the spring plates in any suitable manner, but I prefer the means of attachment herein shown, in which each block is reduced at its inner end, at $14^a$, and passed through an opening in the spring plate having depressed side pieces $13^a$, $13^a$ between which the reduced portion of said block is clamped and held by pins 17, said reduced portions of the block projecting, as shown for yielding contact with the adjacent spring plate, to provide additional resiliency for the tire construction.

The operation of my improved spring tire for vehicle wheels will be readily understood from the foregoing, for as each rubber tread-block comes into contact with the ground it takes up the shock or jar by the action of the spring plate to which it is attached and further by the action of the spring plates against which it bears consecutively according to the load or extent of the shock to which the tire is subjected, and of course the series of blocks around the wheel come into play one after the other as the wheel turns.

By forming the tread portion of the tire in the form of a series of arcuate blocks the traction of the wheel is increased, and the construction and arrangement of the spring plates are such that a positive operation is provided, producing a tire construction that is simple and effective with all the advantages of a pneumatic tire without the disadvantages inherent in such a tire.

Access to any of the spring plates, for examination or repair, may be had by simply removing three of the pins or bolts 15, when the plates released thereby may be swung outward to a more or less extent beyond the rim; and when a tread-block becomes worn it may be readily detached and another substituted.

Having described my invention, I claim:

1. In a vehicle wheel the combination of a channeled rim, a series of spring plates fulcrumed at one end in said rim and projecting from their fulcrums in the same direction around the wheel, each spring plate overlapping spring plates in front of the same, means for limiting the outward movement of the spring plates, and tread blocks attached to the outer ends of said spring plates.

2. In a vehicle wheel the combination of a channeled rim, a series of spring plates fulcrumed at one end within said rim and projecting from their fulcrums in the same direction around the wheel, each spring plate overlapping spring plates in front of the same, tread blocks attached to the spring plates near the outer ends thereof between the fulcrums of companion plates, and transverse pins in the rim against which the outer ends of the spring plates contact, as herein shown and described.

3. In a vehicle wheel, the combination with a channeled rim, of a series of spring plates fulcrumed at one end within said rim and projecting from their fulcrums in the same direction around the wheel, each spring plate overlapping spring plates in front of the same, tread blocks attached to the spring plates near the outer ends thereof between the fulcrums of companion plates, a yielding block at the inner side of the outer end of each spring plate for engagement with the adjacent spring plate, and means for limiting the outward movement of the spring plates.

4. In a vehicle wheel, the combination with a channeled rim, of a series of spring plates fulcrumed at one end within said rim and projecting from their fulcrums in the same direction around the wheel, each spring plate overlapping spring plates in front of the same and having an opening near its outer end with depressed side pieces, rubber tread blocks at the outer ends of the spring plates with reduced inner ends extending through the aforesaid openings therein for attachment to the side pieces, and means for limiting the outward movement of the spring plates, substantially as herein shown and described.

5. In a vehicle wheel, the combination with a rim U-shape in cross-section to provide a channel with parallel walls, of a series of spring plates fulcrumed within the channel at the inner ends thereof and projecting in the same direction around the wheel, each spring plate overlapping spring plates in front of the same with spaces therebetween, tread blocks attached to the outer ends of the spring plates, blocks of yielding material at the inner side of the outer ends of the spring plates for contact with the adjacent spring plates, transverse pins at the outer portions of the channeled rim to limit the outward movement of the spring plates, and rubber strips at the bottom of the channel between the fulcrums for the spring plates, substantially as herein shown and described.

NICHOLAS J. VERRET.